(12) United States Patent
Wimmer et al.

(10) Patent No.: US 9,524,440 B2
(45) Date of Patent: Dec. 20, 2016

(54) SYSTEM AND METHOD FOR SUPERIMPOSED HANDWRITING RECOGNITION TECHNOLOGY

(71) Applicant: MyScript, Nantes (FR)

(72) Inventors: Zsolt Wimmer, Thouare sur Loire (FR); Freddy Perraud, Saint Herblain (FR); Pierre-Michel Lallican, Petit-Mars (FR)

(73) Assignee: MYSCRIPT, Nantes (FR)

( * ) Notice: Subject to any disclaimer, the term of this patent is extended or adjusted under 35 U.S.C. 154(b) by 46 days.

(21) Appl. No.: 14/245,601

(22) Filed: Apr. 4, 2014

(65) Prior Publication Data
US 2015/0286886 A1    Oct. 8, 2015

(51) Int. Cl.
| | |
|---|---|
| *G06K 9/00* | (2006.01) |
| *G06K 9/52* | (2006.01) |
| *G06K 9/62* | (2006.01) |
| *G06K 9/66* | (2006.01) |
| *G06T 5/00* | (2006.01) |
| *G06T 7/00* | (2006.01) |

(52) U.S. Cl.
CPC ....... *G06K 9/00865* (2013.01); *G06K 9/00422* (2013.01); *G06K 9/52* (2013.01); *G06K 9/6267* (2013.01); *G06K 9/66* (2013.01); *G06T 5/002* (2013.01); *G06T 5/006* (2013.01); *G06T 7/0079* (2013.01)

(58) Field of Classification Search
None
See application file for complete search history.

(56) References Cited

U.S. PATENT DOCUMENTS

| | | |
|---|---|---|
| 5,164,996 A | 11/1992 | Pastor |
| 5,454,046 A | 9/1995 | Carman, II |
| 5,544,265 A | 8/1996 | Bozinovic et al. |
| 5,596,656 A | 1/1997 | Goldberg |
| 6,198,846 B1 | 3/2001 | Nishiwaki |

(Continued)

FOREIGN PATENT DOCUMENTS

| | | |
|---|---|---|
| EP | 1030263 | 5/2004 |
| EP | 1519300 | 7/2009 |

(Continued)

OTHER PUBLICATIONS

Yojiro Tonouchi, Akinori Kawamura; *Text Input System using Online Overlapped Handwriting Recognition for Mobile Devices.*

(Continued)

*Primary Examiner* — Hadi Akhavannik
(74) *Attorney, Agent, or Firm* — McDermott Will & Emery LLP

(57) ABSTRACT

A system and method that is able to recognize a user's natural superimposed handwriting without any explicit separation between characters. The system and method is able to process single-stroke and multi-stroke characters. It can also process cursive handwriting. Further, the method and system can determine the boundaries of input words either by the use of a specific user input gesture or by detecting the word boundaries based on language characteristics and properties. The system and method analyzes the handwriting input through the processes of segmentation, character recognition, and language modeling. These three processes occur concurrently through the use of dynamic programming.

23 Claims, 6 Drawing Sheets

(56) References Cited

U.S. PATENT DOCUMENTS

| | | | |
|---|---|---|---|
| 6,233,351 B1 | 5/2001 | Feeney et al. | |
| 6,292,190 B1 | 9/2001 | Corn | |
| 6,295,372 B1 | 9/2001 | Hawkins et al. | |
| 6,411,732 B1 | 6/2002 | Saund | |
| 6,459,442 B1 | 10/2002 | Edwards et al. | |
| 6,476,834 B1 | 11/2002 | Doval et al. | |
| 6,535,619 B1 | 3/2003 | Suwa et al. | |
| 6,594,390 B2 | 7/2003 | Frink et al. | |
| 6,609,093 B1* | 8/2003 | Gopinath | G06K 9/6234 382/190 |
| 6,731,803 B1 | 5/2004 | Aharonson et al. | |
| 6,999,616 B2 | 2/2006 | Nacken | |
| 7,177,473 B2 | 2/2007 | Aharonson | |
| 7,200,591 B2 | 4/2007 | Silverbrook et al. | |
| 7,266,769 B2 | 9/2007 | Thacker | |
| 7,324,691 B2 | 1/2008 | Li et al. | |
| 7,352,902 B2 | 4/2008 | Li et al. | |
| 7,372,993 B2 | 5/2008 | Lagardere et al. | |
| 7,385,595 B2 | 6/2008 | Bryborn et al. | |
| 7,639,250 B2 | 12/2009 | Xu et al. | |
| 7,738,744 B2 | 6/2010 | Silverbrook et al. | |
| 7,859,699 B2 | 12/2010 | Silverbrook et al. | |
| 7,885,464 B2 | 2/2011 | Kawamura et al. | |
| 7,907,141 B2 | 3/2011 | Saund | |
| 7,945,097 B2 | 5/2011 | Biswas et al. | |
| 7,952,614 B2 | 5/2011 | Lee | |
| 8,094,939 B2 | 1/2012 | Zhang et al. | |
| 8,094,941 B1 | 1/2012 | Rowley et al. | |
| 8,094,942 B1 | 1/2012 | Rowley et al. | |
| 8,102,383 B2 | 1/2012 | Cohen et al. | |
| 8,116,569 B2 | 2/2012 | Markiewicz et al. | |
| 8,159,501 B2 | 4/2012 | Rao | |
| 8,175,389 B2 | 5/2012 | Matic et al. | |
| 8,255,822 B2 | 8/2012 | Markiewicz et al. | |
| 8,270,722 B2 | 9/2012 | Ito et al. | |
| 8,310,461 B2 | 11/2012 | Morwing et al. | |
| 8,331,671 B2 | 12/2012 | Dai | |
| 8,341,556 B2 | 12/2012 | Madhvanath et al. | |
| 8,363,949 B2 | 1/2013 | Rowley et al. | |
| 8,538,156 B2 | 9/2013 | Yamanouchi | |
| 8,564,620 B2 | 10/2013 | Bellamy et al. | |
| 8,670,623 B2 | 3/2014 | Oota | |
| 8,718,375 B2 | 5/2014 | Ouyang et al. | |
| 9,142,056 B1 | 9/2015 | Baran et al. | |
| 2004/0213455 A1* | 10/2004 | Lossev | G06K 9/222 382/159 |
| 2005/0175241 A1* | 8/2005 | Napper | 382/186 |
| 2007/0140561 A1* | 6/2007 | Abdulkader et al. | 382/187 |
| 2008/0198146 A1 | 8/2008 | Bryborn et al. | |
| 2008/0288896 A1 | 11/2008 | Madhvanath et al. | |
| 2008/0292190 A1 | 11/2008 | Biswas et al. | |
| 2009/0278848 A1 | 11/2009 | Robertson et al. | |
| 2010/0100866 A1 | 4/2010 | Kamper et al. | |
| 2010/0149109 A1 | 6/2010 | Elias | |
| 2010/0251188 A1 | 9/2010 | Fu et al. | |
| 2011/0185272 A1 | 7/2011 | Rajkumar | |
| 2011/0279455 A1 | 11/2011 | McDaniel | |
| 2011/0285634 A1 | 11/2011 | Lim et al. | |
| 2011/0293181 A1* | 12/2011 | Napper | 382/179 |
| 2012/0051594 A1 | 3/2012 | Kim et al. | |
| 2012/0176416 A1 | 7/2012 | Dondurur et al. | |
| 2012/0221938 A1 | 8/2012 | Patterson et al. | |
| 2013/0034303 A1 | 2/2013 | Morwing et al. | |
| 2013/0089257 A1 | 4/2013 | Kim et al. | |
| 2013/0162553 A1 | 6/2013 | Rowley et al. | |

FOREIGN PATENT DOCUMENTS

| | | |
|---|---|---|
| EP | 1454225 | 1/2013 |
| WO | WO 2012/115853 | 8/2012 |
| WO | WO 2014/046302 | 3/2014 |

OTHER PUBLICATIONS

Hiroshi Shimodaira, Takashi Sudo, Mitsuru Nakai, and Shigeki Sagayama; *On-line Overlaid-Handwriting Recognition Based on Substroke HMMS*, pp. 1-5.

Takeo Igarashi, Satoshi Matsuoka, Sachiko Kawachiya, Hidehiko; *Interactive Beautification: A Technique for Rapid Geometric Design*, pp. 1-10.

Salman Cheema, Sumit Gulawani, Joseph J. LaViola Jr.; *QuickDraw: Improving Drawing Experience for Geometric Diagrams*.

Senior et al., "An Off-Line Cursive Handwriting Recognition System", IEEE Transactions on Pattern Analysis and Machine Intelligence, IEEE Computer Society, USA, vol. 20, No. 3, pp. 309-321, Mar. 1, 1998.

Shimodaira et al., "On-line Overlaid-Handwriting Recognition Based on Substroke HMMs", Proceedings of the Seventh International Conference on Document Analysis and Recognition, pp. 1043-1047, Aug. 3, 2003.

Wan et al., "On-line Chinese Character Recognition System for Overlapping Samples", International Conference on Document Analysis and Recognition, pp. 799-803, Sep. 1, 2011.

Lv et al., "Learning-Based Candidate Segmentation Scoring for Real-Time Recognition of Online Overlaid Chinese Handwriting", 12th International Conference on Document Analysis and Recognition, pp. 74-78, Aug. 25, 2013.

International Search Report issued for PCT/IB2015/000563 mailed Sep. 21, 2015 (3 pages).

Written Opinion of the International Searching Authority issued for PCT/IB2015/000563 mailed Sep. 21, 2015 (6 pages).

Gao et al., "A Two-Stage Online Handwritten Chinese Character Segmentation Algorithm Based on Dynamic Programming", Eight International Proceedings on Document Analysis and Recognition, IEEE, pp. 735-739, Sep. 1, 2005.

Zou et al., "Overlapped Handwriting Input on Mobile Phones", 2011 International Conference on Document Analysis and Recognition, pp. 369-373, Sep. 21, 2011.

International Search Report issued for PCT/EP2016/000799 mailed Aug. 10, 2016 (4 pages).

Written Opinion of the International Searching Authority issued for PCT/EP2016/000799 mailed Aug. 10, 2016 (10 pages).

\* cited by examiner

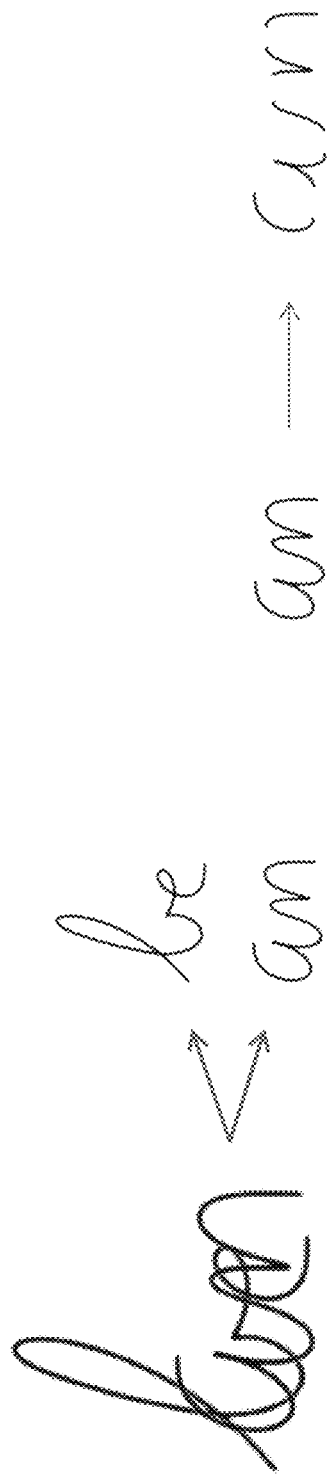
FIG. 4
FIG. 5

SYSTEM AND METHOD FOR SUPERIMPOSED HANDWRITING RECOGNITION TECHNOLOGY

TECHNICAL FIELD

The present invention relates generally to the field of computing device interfaces capable of recognizing user input handwriting of various characters.

BACKGROUND

Computing devices continue to become more ubiquitous to daily life. They take the form of computer desktops, laptops, tablet PCs, e-book readers, mobile phones, smartphones, wearable computers, global positioning system (GPS) units, enterprise digital assistants (EDAs), personal digital assistants (PDAs), game consoles, and the like. Further, computing devices are being incorporated into cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. Either of these methods of input can be used generally for drawing or inputting text. When a user input is text, the computing device must interpret the user's handwriting using an on-line handwriting recognition system or method.

Generally, on-line handwriting recognition systems or methods monitor the initiation of a stroke, such as when the user contacts a touch sensitive surface (pen-down); the termination of a stroke, such as when the user stops contacting a touch sensitive surface (pen-up); and any movements (gestures or strokes) the user makes with his or her finger or pen between the initiation and termination of the stroke.

On-line handwriting recognition systems or methods usually consist of a preprocessing stage, a segmentation stage, a recognition stage, and an interpretation stage. Generally, the preprocessing stage includes discarding irrelevant input data and normalizing, sampling, and removing noise from relevant data. The segmentation stage specifies the different ways to break down the input data into individual characters and words. The recognition generally includes a feature extraction stage, which characterizes the different input segments, and a classification stage which associates the segments with possible character candidates. Finally, the interpretation stage generally includes identifying the characters and/or words associated with the character candidates. In practice, on-line handwriting recognition systems or methods may include these stages along with additional stages. Further, on-line handwriting recognition systems or methods may not clearly delineate each stage.

On-line handwriting recognition systems or methods can be single-stroke or multi-stroke. Single stroke recognition uses single-stroke shorthand for each character of an alphabet (e.g., Palm, Inc.'s Graffiti). These systems or methods have less input errors but require users to memorize new stroke patterns for a whole alphabet. Multi-stroke recognition can recognize natural handwriting and is often necessary when using on-line handwriting recognition systems with languages that include characters that are not easily reduced to single strokes, such as Japanese or Chinese characters.

The type of computing device can also determine the type of handwriting recognition system or method utilized. For instance, if the input surface is large enough (such as a tablet), the user can input text or data anywhere on or above the input surface, as if the user was writing on a piece of paper. As devices become smaller, different systems or methods, such as multi-box or single-box, have been developed. Multi-box systems or methods divide the input surface into multiple areas, such as three boxes, where a user inputs each character in each box, one after another. These are advantageous because character segmentation becomes minimal or unnecessary. They also allow for multi-stroke characters, which can be analyzed with isolated-character recognition techniques.

For even smaller devices, the input surface may not be large enough for multiple boxes, so the surface is essentially a single-box writing interface. In this instance, only one character can be written at a time. Although single-box interfaces lend themselves to single-stroke recognition systems, certain languages, such as Japanese or Chinese, have multi-stroke characters that do not easily reduce to single-stroke shorthand. Further, most natural handwriting contains multi-stroke characters, regardless of the language.

Single-box interfaces using multi-stroke systems or methods create additional problems including determining the beginning and end of characters and clearly displaying the images of the input characters. One way to determine the beginning and end of characters requires the user to explicitly pause between each character. However, this is not optimal because it slows down the user from inputting data. In a single box system or method, where a user is able to input characters continuously and without a pause, input characters would be overlaid or superimposed on each other. This is referred to as superimposed handwriting, overlaid handwriting, or "on-top-writing."

The present on-line superimposed handwriting recognition system and method provides improved results for user input handwriting recognition by performing segmentation, recognition, and interpretation concurrently, rather than sequentially. The present system and method performs these processes at the same level rather than applying a hierarchy to the steps. By having segmentation, recognition, and interpretation occur collaboratively, the present system provides the user with the best possible character, word, and sentence candidates based on the user input.

SUMMARY

The examples of the present invention that are described herein below provide methods, systems, and software for use in on-line superimposed handwriting recognition. These permit a user to enter characters into a computing device using his or her natural handwriting without any explicit separation between characters. The present handwriting recognition system and method includes a computing device connected to an input device in the form of an input surface. A user is able to provide input by applying pressure to or gesturing above the input surface using either his or her finger or an instrument such as a stylus or pen. The present system and method monitors the input strokes. After preprocessing the input strokes, the segmentation expert, recognition expert, and language expert simultaneously analyze the input data. These three experts work collaboratively through dynamic programming to process input strokes and generate candidates at the character, word, and sentence level.

An object of the disclosed system and method is to provide an on-line handwriting recognition system and method that can interpret a user's natural handwriting style. This can be done by providing a system and method whereby the segmentation expert, which creates a segmentation graph based on the user input and input from the recognition expert and language expert; recognition expert, which associates a list of character candidates with recognition scores of each node of the segmentation graph; and language expert, which generates linguistic meaning of the different paths in the segmentation graph, all work collaboratively through dynamic programming.

Another object of the disclosed system and method is to provide an on-line handwriting recognition system and method that can recognize superimposed handwriting, where characters are written one over another without any explicit separation between consecutive letters. This can be done by providing a system and method whereby the segmentation expert, recognition expert, and language expert work collaboratively through dynamic programming to provide the most likely candidates for character, word, and sentence inputs.

Yet another object of the disclosed system and method is to provide an on-line handwriting recognition system and method that can recognize multiple-stroke characters. This can be done by providing a system and method whereby the segmentation expert creates a segmentation graph that is based on the user input and the dynamic programming that involves the recognition and language experts analyzing the segmentation graph.

Another object of the disclosed system and method is to provide an on-line handwriting recognition system and method that can recognize cursive writing where attached characters are written one over the other. This is done by providing a system and method whereby the segmentation expert detects particular points defining locations for breaking a stroke into its constituting segments.

A further object of the disclosed system and method is to provide an on-line handwriting recognition system and method that provides word boundaries based on either a specific input stroke or by automatically detecting word boundaries. This is done by providing a system and method whereby the present system including the segmentation expert, recognition expert, and language expert all expect a specific input stroke to break up input characters into words; or the three experts automatically add word breaks by analyzing all the input characters holistically.

The present system and method will be more fully understood from the following detailed description of the examples thereof, taken together with the drawings.

BRIEF DESCRIPTION OF THE DRAWINGS

FIG. 4 shows a schematic pictorial of a possible user input of cursive user input in accordance with an example of the present system.

FIG. 5 shows schematic pictorial illustration of the segmentation of a cursive user input in accordance with an example of the present system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies described herein generally relate to on-line handwriting recognition and more specifically to systems and methods for superimposed handwriting recognition on various computing devices. The system and method described herein may be used to recognize a user's natural handwriting input through the concurrent processes of segmentation, recognition, and interpretation to provide the best possible character, word, and sentence candidates.

Figure 1:
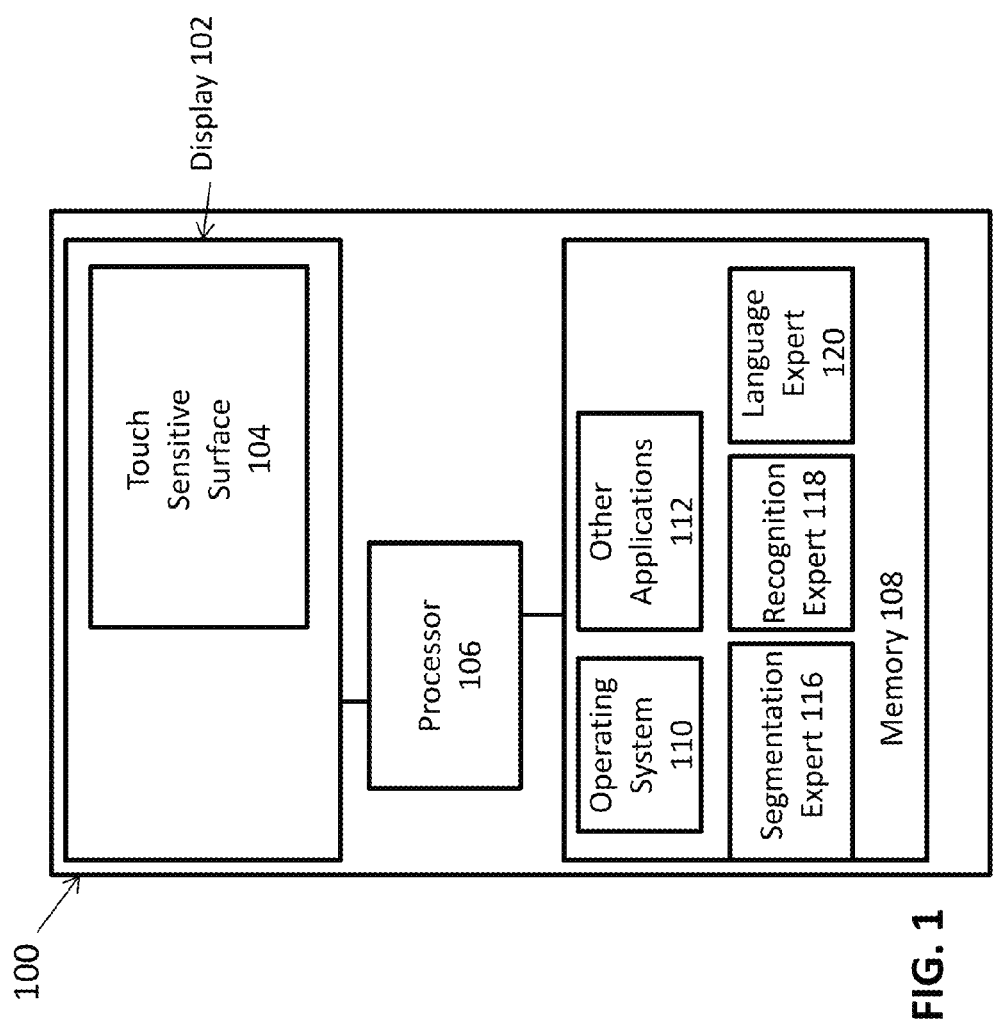
FIG. 1 shows a block diagram of a computing device in accordance with an example of the present system.

FIG. 1 shows a block diagram of a computing device 100. This computing device can be a computer desktop, laptop, tablet PC, e-book reader, mobile phone, smartphone, wearable computer, digital watch, global positioning system (GPS) unit, enterprise digital assistant (EDA), personal digital assistant (PDA), or game console. The device 100 includes at least one processing element, some form of memory and input and/or output (I/O) devices. The components communicate with each other through input and output means, such as connectors, lines, buses, cables, buffers, electromagnetic links, networks, modems, transducers, IR ports, antennas, or other means as known to those of ordinary skill in the art.

The device 100 includes at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art. The input surface 104 may be bounded by a permanent or video-generated border that clearly identifies its boundaries.

In addition to the input surface 104, the device 100 may include one or more additional I/O devices (or peripherals) that are communicatively coupled via a local interface. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

One such I/O device may be at least one display 102 for outputting data from the computing device such as images, text, and video. The display 102 may use LCD, plasma, CRT, or any other appropriate technology as known to those of ordinary skill in the art. At least some of display 102 could be co-located with the input surface 104. Other additional I/O devices may include input devices such as a keyboard, mouse, scanner, microphone, touchpads, bar code readers, laser readers, radio-frequency device readers, or any other appropriate technology as known to those of ordinary skill in the art. Furthermore, the I/O devices may also include output devices such as a printer, bar code printers, or any other appropriate technology as known to those of ordinary skill in the art. Finally, the I/O devices may further include devices that communicate both inputs and outputs such as a modulator/demodulator (modem; for accessing another device, system, or network), a radio frequency (RF) or other transceiver, a telephonic interface, a bridge, a router, or any other appropriate technology as known to those of ordinary skill in the art.

The device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, SDRAM, etc.)) and nonvolatile memory elements (e.g., ROM, EPROM, flash PROM, EEPROM, hard drive, magnetic or optical tape, memory registers, CD-ROM, WORM, DVD, redundant array of inexpensive disks ("RAID"), another direct access storage device ("DASD"), etc.). Moreover, memory 108 may incorporate electronic, magnetic, optical, and/or other types of storage media. The memory 108 can have a distributed architecture where various components are situated remote from one another but can also be accessed by the processor 106. The memory 108 is coupled to a processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in memory 108 includes the on-line handwriting computer program, which may include one or more separate programs, each of which comprises an ordered listing of executable instructions for implementing logical functions. The operating system 110 controls the execution of the on-line handwriting computer program. The operating system 110 may be a proprietary operating system or a commercially available operating system, such as PALM®, WINDOWS®, MAC and IPHONE OS®, LINUX, ANDROID, etc. It is understood that other operating systems may also be utilized without departing from the spirit of the system and method disclosed herein.

The memory 108 may include other application programs 112 related to handwriting recognition as described herein, totally different functions, or both. The applications 112 include programs provided with the device 100 upon manufacture and may further include programs downloaded into the device 100 after manufacture. Some examples include a text editor, telephone dialer, contacts directory, instant messaging facility, email program, word processing program, web browser, camera, etc.

The on-line handwriting recognition computer program with support and compliance capabilities may be a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system. Furthermore, the on-line handwriting recognition computer program with support and compliance capabilities can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The system is initiated when processor 106 detects a user entered stroke via the input surface 104. The user may enter a stroke with a finger or some instrument such as a pen or stylus. A stroke is characterized by at least the stroke initiation location, the stroke termination location, and the path upon which the user connects the stroke initiation and termination locations. Because different users may naturally write the same letter with slight variations, the present system accommodates a variety of ways in which each letter may be entered.

Figure 2:
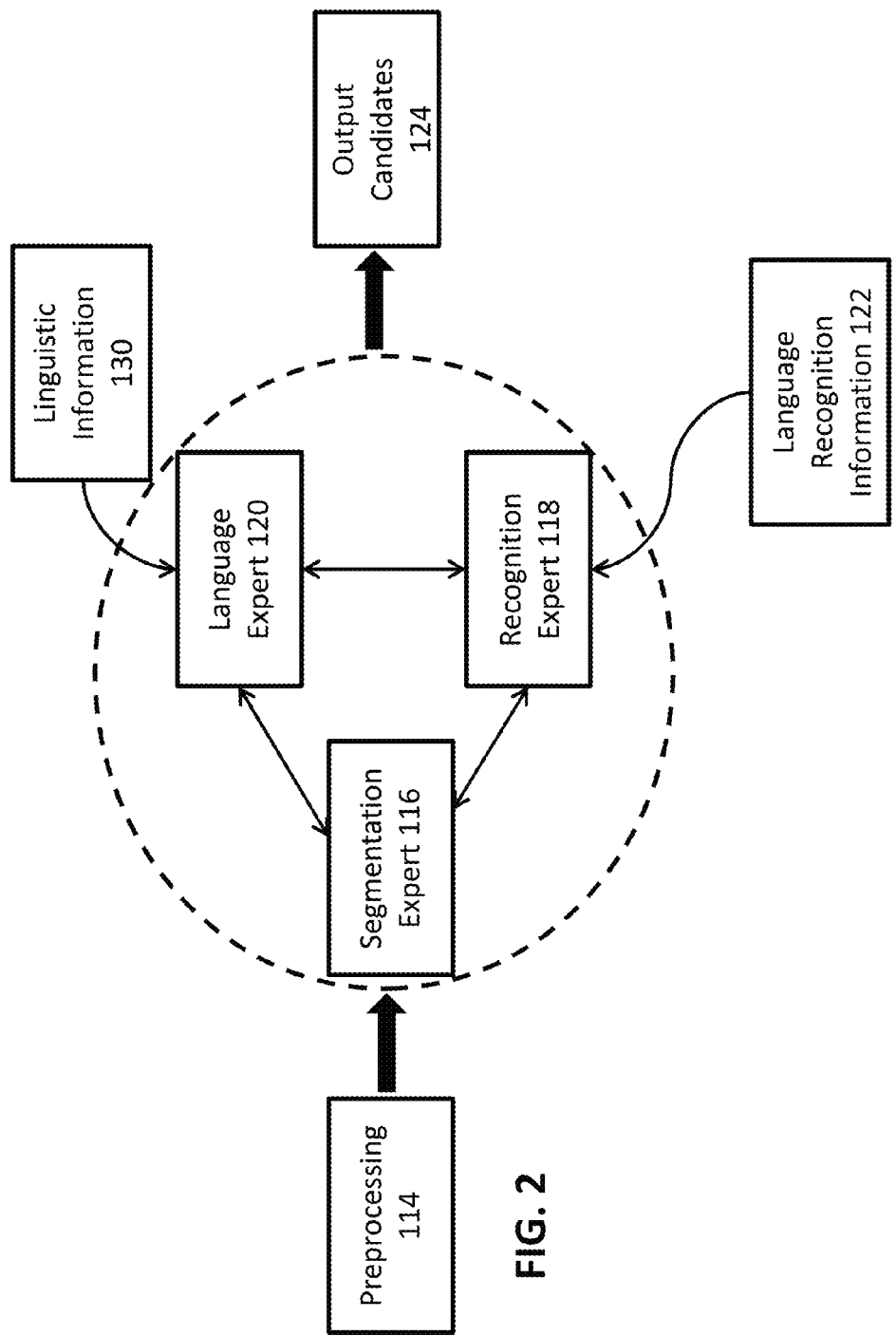
FIG. 2 shows a block diagram of a system for on-line handwriting recognition in accordance with an example of the present system.

FIG. 2 is a schematic pictorial of a system for on-line handwriting recognition in accordance with an example of the present system. Once initiated with at least one input stroke, the system preprocesses 114 the strokes. Preprocessing 114 can include normalizing the path connecting the stroke initiation and termination locations by applying size normalization and/or methods such as B-spline approximation to smooth the input. The input stroke is then passed to three experts (segmentation expert 116, recognition expert 118, and language expert 120) that collaborate through dynamic programming to generate output candidates 124 at the character, word, and sentence level.

Figure 3B:
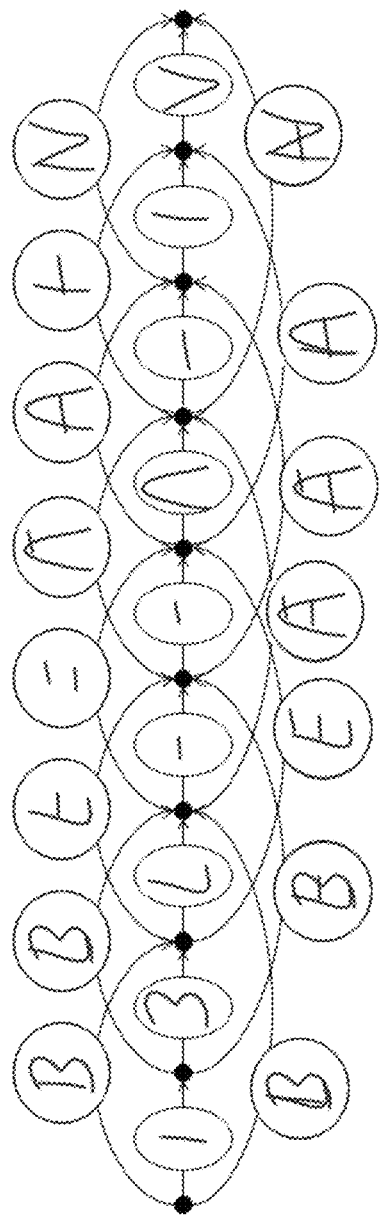
FIG. 3B shows a schematic pictorial of a segmentation graph in accordance with an example of the present system.
Figure 3A:
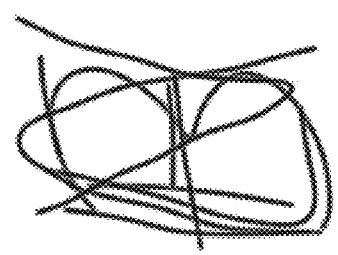
FIG. 3A shows a pictorial illustration of a possible user input in accordance with an example of the present system.

The segmentation expert 116 defines the different ways to segment the input strokes into words and individual character hypotheses. To form the character hypotheses, the segmentation expert 116 groups consecutive strokes of the original input. This results in a segmentation graph where each node corresponds to at least one character hypothesis and where adjacency constraints between characters are handled by the node connections. Nodes are considered adjacent if the corresponding hypotheses have no common stroke but whose strokes are consecutive in the original input. FIG. 3A shows a possible user input of the word BEAN in accordance with an example of the present system. Specifically, the figure displays an example of superimposed writing with multi-stroke characters. FIG. 3B shows a possible segmentation graph of the input of FIG. 3A created in accordance with an example of the present system.

Superimposed handwriting recognition systems and methods must also determine where one word ends and another begins. The present system and method is capable of multiple embodiments to retrieve word boundaries. In one embodiment, a user is required to insert a specific gesture after each word. In this embodiment, the specific gesture is output as a space character. This embodiment brings more robustness to the segmentation process since it reduces the different ways to segment the input strokes into words and individual character hypotheses. However, this embodiment forces the user to add a specific gesture indicating the end of each word, which might be missed by some users.

An alternative embodiment does not require a specific gesture separating words. Instead, the on-line handwriting recognition computer program automatically detects word boundaries with the help of the recognition expert 118 and/or language expert 120, which will be described in detail below. For instance, the language expert 120 uses linguistic information 130 to retrieve the word boundaries based on, among other things, lexical knowledge and techniques modeling the likelihood of a sequence of consecutive words in a given language, such as N-grams models, syntactic parsing, semantic analysis, etc.

For example, a user may enter the character sequence "whattimeisit?" with superimposed writing in an embodiment based on linguistic information 130 extracted from the English language. This alternative embodiment would output the word segmentation "what time is it?" making a global meaning to the input strokes and retrieving the word boundaries based on the linguistic information 130. This embodiment has the advantage of allowing the user to input a sequence of words without inserting a specific gesture between each word.

In another embodiment, the two previous methods can be combined. In that case, the user can insert a specific gesture after each word for getting more robustness to detect word boundaries. But whenever the user neglects to insert a gesture, the handwriting recognition system is able to detect word boundaries with the help of the recognition expert 118 and/or language expert 120.

In one example, the segmentation expert is not limited to handprint writing input where each individual character is separated from its neighbor characters with a pen-up, as seen in FIGS. 3A and 3B. The segmentation expert 116 of the present system is also able to process cursive writing where attached characters are written one over the other. FIG. 4 illustrates a cursive user input of words "be" and "an." When interpreting cursive user input, the segmentation expert 116 segments each stroke based on a detection of particular points defining locations for breaking a stroke into its constituting segments. FIG. 5 illustrates an example of a cursive "an" being broken up into its constituting segments. The particular points for breaking a stroke into its constituting segments may be defined by crossing points, a change in the slope of stroke path, etc. These constituting segments are used to construct the segmentation graph.

Figure 6:
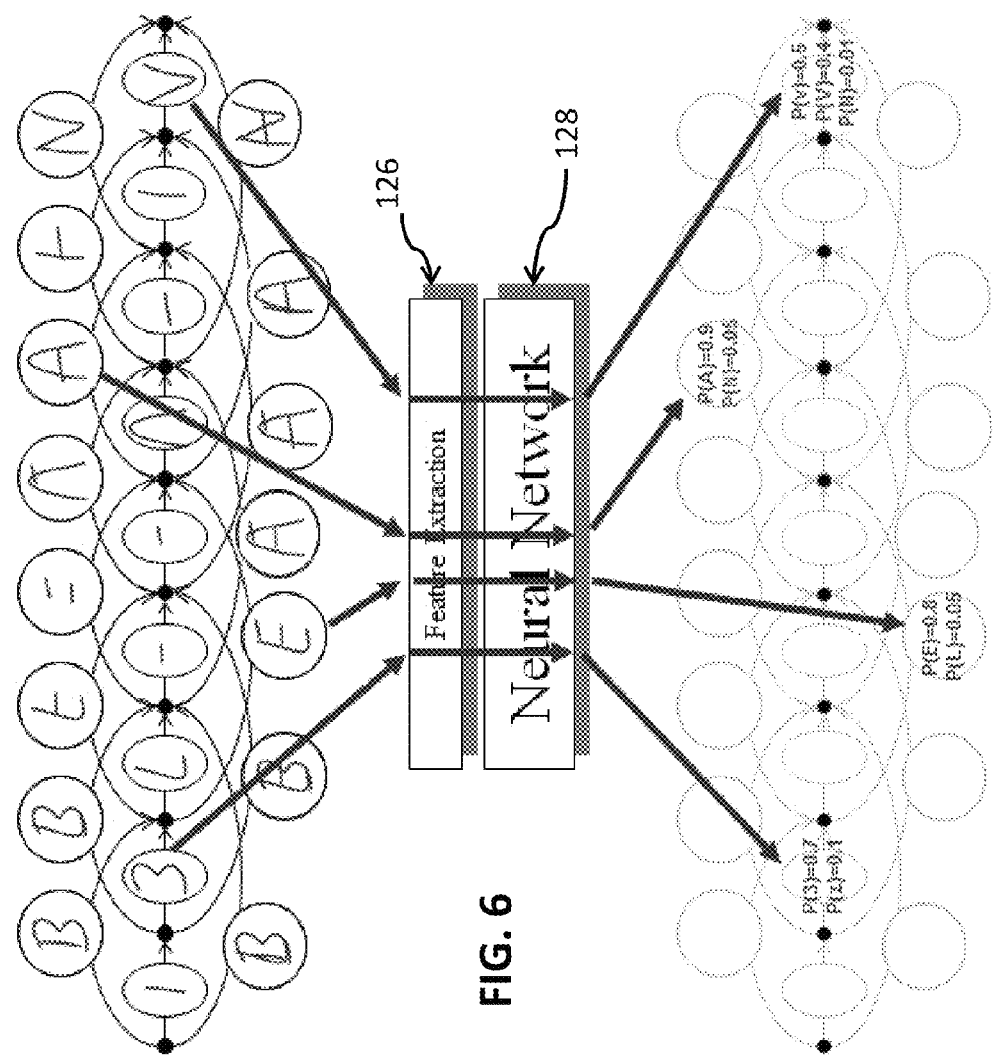
FIG. 6 shows a schematic pictorial illustration of the recognition expert in accordance with an example of the present system.

The recognition expert 118 associates a list of character candidates with probabilities or recognition scores for each node of the segmentation graph. These probabilities or recognition scores are based on the language recognition information 122. The language recognition information defines all the different characters and symbols of the alphabet underlying to the specified language. This information is language dependent and comprises general differences in alphabets as well as the ability to recognize various individual styles of writing the alphabets. For instance, the way an individual writes a "7" can be quite different depending on whether that individual is from the USA, France, or even Korea. Continuing the example given in FIGS. 3A and 3B, FIG. 6 illustrates an embodiment of the recognition expert 118 that includes two stages. The first stage of the recognition expert 118, feature extraction 126, is based on a combination of dynamic and static features. For instance, the dynamic features can be extracted from the trajectory of the input stroke and are based on information such as position, direction, and curvature of the input stroke. Static features can be extracted from a bitmap representation of the input stroke and can be based on projections and histograms.

The second stage of the recognition expert 118 of the present embodiment is classification of the features extracted by a pattern classifier such as Neural Networks 128. In the present embodiment, the Neural Networks can be simple multilayer perceptrons. The Neural Networks can also include an extra class enabling the Neural Network to reject node hypotheses corresponding to badly segmented characters. The recognition expert 118 outputs a list of character candidates with probabilities or recognition scores for each node of the segmentation graph. An alternative embodiment might make use of another kind of Neural Network such as Deep Neural Network, Convolutional Neural Network, or Recurrent Neural Network. More generally, any kind of pattern classifier could be used to address this recognition task (e.g., Support Vector Machine, Hidden Markov Model).

Figure 7:
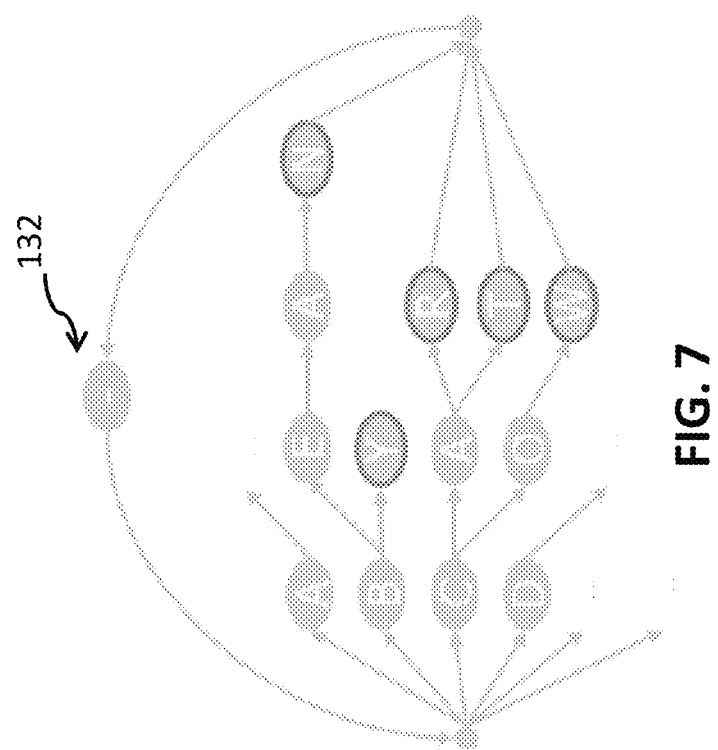
FIG. 7 shows a schematic pictorial illustration of a linguistic automaton in accordance with an example of the present system.

The language expert 120 generates linguistic meaning for the different paths in the segmentation graph. It checks the candidates suggested by the other experts according to the linguistic information 130 available. This linguistic information 130 can include a lexicon, regular expressions, etc. The language expert 120 aims at finding the best recognition path. In one embodiment, the language expert 120 does this by exploring a language model such as final state automaton (determinist FSA) representing the content of linguistic information 130. FIG. 7, building on examples in FIGS. 3A, 3B, and 6, shows a linguistic automaton with a lexicon that only contains the words BEAN, BY, CAR, CAT, and COW. Further, FIG. 7 represents an embodiment of the language expert that expects the user to insert a dash 132 to define a word boundary.

In addition to the lexicon constraint, the language expert 120 may use statistical information modeling for how frequent a word or a given sequence of words appears in the specified language or is used by a specific user. For instance, a word tri-gram language model may be used to evaluate the linguistic likelihood of the interpretation of a given path of the segmentation graph.

The segmentation expert 116, recognition expert 118, and language expert 120 work collaboratively through dynamic programming to process input strokes and generate output candidates 124 at the character, word, and sentence level. In one embodiment, the dynamic programming is based on a beam search technique that searches for the best path both in the segmentation graph and the linguistic model. In this instance, the best path is the path corresponding to the lowest cost. The lowest cost path could be defined as the sum of:

Costs of all the character candidates encountered in the corresponding path into the segmentation graph. These costs can be estimated from the probabilities or recognition scores of each node belonging to this path in the segmentation graph. In one embodiment, the costs are estimated from the Neural Network probabilities by applying a −log non-linear function.

Costs of all words encountered in the corresponding path of the linguistic model. Those costs can be estimated from the N-gram probabilities from the language expert 120. In one embodiment, the costs are estimated from the N-gram probabilities from the language expert 120 by applying a −log non-linear function.

For overall training of the present on-line handwriting recognition computer program, a global discriminant training scheme at the text level with automatic learning of all parameters of the classifiers (e.g., Neural Network) 128 and any meta-parameters of the system may be used, although other training systems and methods may be used. Through the present on-line superimposed handwriting recognition system and method, the best results for user input handwriting recognition are provided by performing segmentation, recognition, and interpretation concurrently, rather than sequentially or in a hierarchal nature.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A non-transitory computer readable medium having a computer readable program code embodied therein, said computer readable program code adapted to be executed to implement a method for providing handwriting recognition for superimposed stroke input, said method comprising:
   creating a segmentation graph based on a plurality of input strokes, at least two of the strokes being at least partially superimposed on one another, wherein the segmentation graph consists of nodes and paths corresponding to character hypotheses formed by segmenting the input strokes to take into account the at least partially superimposed strokes;
   assigning a recognition score to each node of the segmentation graph based on language recognition information;
   generating linguistic meaning of the input strokes by optimizing the recognition scores of the node paths of the segmentation graph based on a language model; and
   providing an output based on the simultaneous analysis of the segmentation graph, the recognition score, and the language model.

2. The non-transitory computer readable medium according to claim 1, wherein the input stroke is preprocessed, wherein the preprocessing includes at least the normalization and smoothing of the input stroke.

3. The non-transitory computer readable medium according to claim 2, wherein the segmentation graph is based on continuous input strokes that have been broken into constituting segments.

4. The non-transitory computer readable medium according to claim 2, wherein the assigning of a recognition score comprises a feature extraction stage and a classification of features extracted by neural networks.

5. The non-transitory computer readable medium according to claim 4, wherein the feature extraction stage comprises at least one dynamic feature and at least one static feature.

6. The non-transitory computer readable medium according to claim 4, wherein the neural networks are multilayer perceptrons.

7. A method for providing handwriting recognition for a superimposed input stroke, said method comprising:
   creating a segmentation graph based on a plurality of input strokes, at least two of the strokes being at least partially superimposed on one another, wherein the segmentation graph consists of nodes and paths corresponding to character hypotheses formed by segmenting the input strokes to take into account the at least partially superimposed strokes;
   assigning a recognition score to each node of the segmentation graph based on language recognition information;
   generating linguistic meaning of the input strokes by optimizing the recognition scores of the node paths of the segmentation graph based on a language model; and
   providing an output based on the simultaneous analysis of the segmentation graph, the recognition score, and the language model.

8. A method according to claim 7, wherein the input stroke is preprocessed, wherein the preprocessing includes at least the normalization and smoothing of the input stroke.

9. A method according to claim 8, wherein the segmentation graph is based on continuous input strokes that have been broken into constituting segments.

10. A method according to claim 8, wherein the assigning of a recognition score comprises a feature extraction stage and a classification of features extracted by neural networks.

11. A method according to claim 10, wherein the feature extraction stage comprises at least one dynamic feature and at least one static feature.

12. A method according to claim 10, wherein the neural networks are multilayer perceptrons.

13. A system for providing handwriting recognition for a superimposed stroke input to a computing device, the computing device comprising a processor and at least one non-transitory computer readable medium for recognizing the input under control of the processor, said at least one program configured to:
   create a segmentation graph based on a plurality of input strokes, at least two of the strokes being at least partially superimposed on one another, wherein the segmentation graph consists of nodes and paths corresponding to character hypotheses formed by segmenting the input strokes to take into account the at least partially superimposed strokes;
   assign a recognition score to each node of the segmentation graph based on language recognition information;
   generate linguistic meaning of the input strokes by optimizing the recognition scores of the node paths of the segmentation graph based on a language model; and
   provide an output based on the simultaneous analysis of the segmentation graph, the recognition score, and the language model.

14. A system according to claim 13, wherein the segmentation graph is based on continuous input strokes that have been broken into constituting segments.

15. A system according to claim 13, wherein the assigning of a recognition score comprises a feature extraction stage and a classification of features extracted by neural networks.

16. A system according to claim 15, wherein the feature extraction stage comprises at least one dynamic feature and at least one static feature.

17. A system according to claim 15, wherein the neural networks are multilayer perceptrons.

18. The non-transitory computer readable medium according to claim 1, wherein the language model includes linguistic information specific to one or more languages.

19. A method according to claim 7, wherein the language model includes linguistic information specific to one or more languages.

20. A system according to claim 13, wherein the language model includes linguistic information specific to one or more languages.

21. The non-transitory computer readable medium according to claim 1, wherein the generation of the linguistic meaning includes recognizing word boundaries in the superimposed input based on the language model.

22. A method according to claim 7, wherein the generation of the linguistic meaning includes recognizing word boundaries in the superimposed input based on the language model.

23. A system according to claim 13, wherein the generation of the linguistic meaning includes recognizing word boundaries in the superimposed input based on the language model.

* * * * *